United States Patent [19]
Strayer

[11] 3,771,750
[45] Nov. 13, 1973

[54] HELICOPTER RESCUE CONTAINER

[76] Inventor: James W. Strayer, 602 Gerald Ave., New Carlisle, Ohio 45344

[22] Filed: June 29, 1971

[21] Appl. No.: 157,916

[52] U.S. Cl.................................. 244/137 P, 9/14
[51] Int. Cl............................................ B64d 25/02
[58] Field of Search.................... 244/137 R, 137 P, 244/140, 141, 1 R; 9/14; 187/1, 16, 97; 220/8, 71, 72

[56] References Cited
UNITED STATES PATENTS

| | | | |
|---|---|---|---|
| 2,950,882 | 8/1960 | Yost.................................. | 244/140 |
| 3,036,315 | 5/1962 | Karnow........................... | 244/137 P |
| 3,444,569 | 5/1969 | Greenberg et al............... | 244/137 P |
| 3,467,346 | 9/1969 | Carson............................. | 244/137 R |
| 3,476,339 | 11/1969 | Pugh................................ | 244/137 R |
| 2,950,881 | 8/1960 | Schwoebel....................... | 244/140 |
| 3,539,070 | 11/1970 | Dunlea, Jr....................... | 244/1 R |

Primary Examiner—Duane A. Reger
Assistant Examiner—Jesus D. Sotelo
Attorney—Harry A. Herbert, Jr. et al.

[57] ABSTRACT

A portable helicopter-borne and self-contained rescue and delivery capsule having a cylindrical-shaped and cage-like body capable of carrying at least one person, and formed with cone members on each end thereof providing a streamlined configuration for facilitating penetration of both heavy forest and canopy jungle areas.

3 Claims, 2 Drawing Figures

PATENTED NOV 13 1973 3,771,750

INVENTOR.
JAMES W. STRAYER
BY Harry A. Herbert Jr.
ATTORNEY
Arthur R. Parker
AGENT

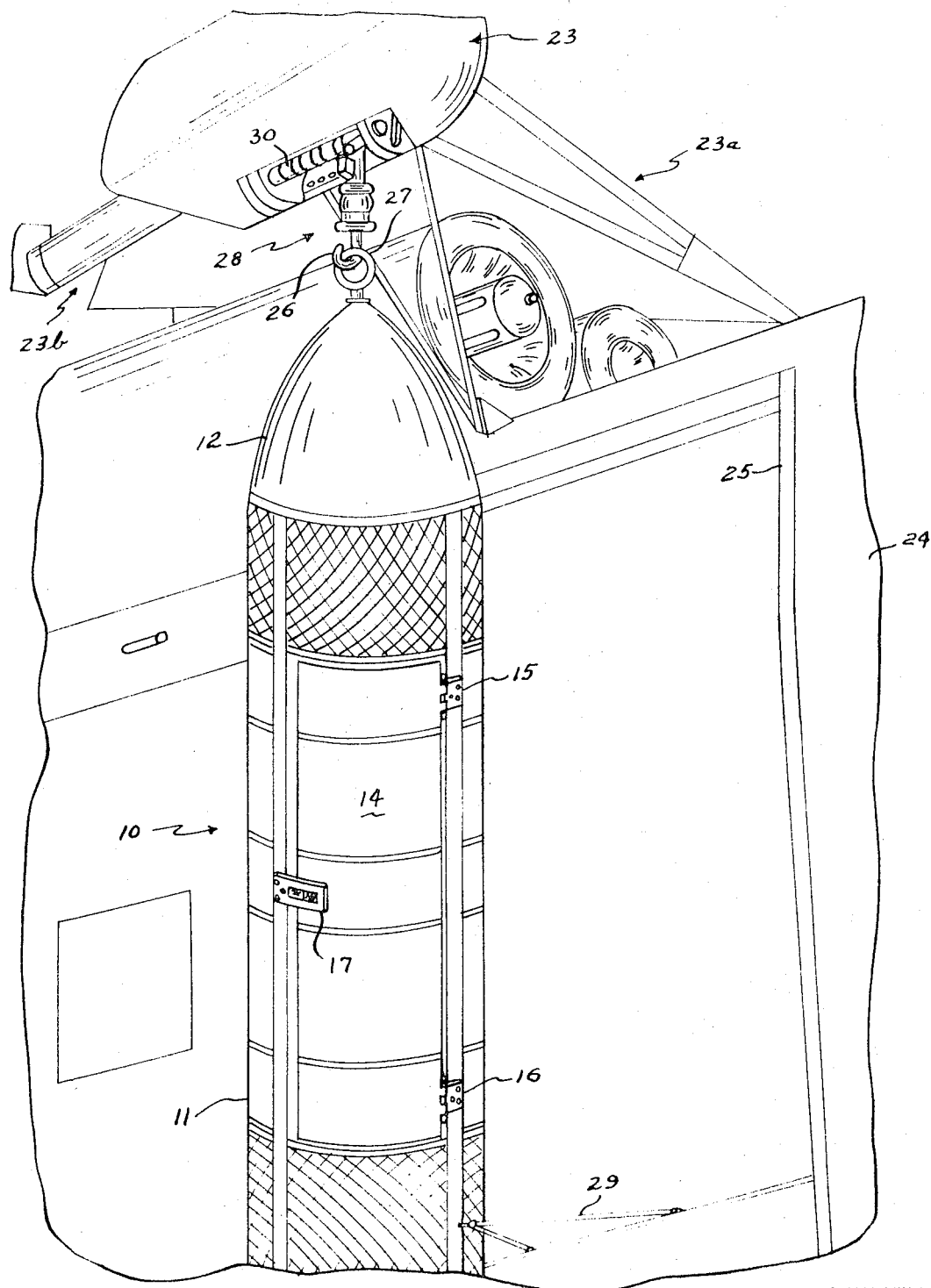

HELICOPTER RESCUE CONTAINER

BACKGROUND OF THE INVENTION

This invention relates particularly to the helicopter rescue of downed aircrew members and/or wounded personnel.

The relatively recent considerable utilization of the helicopter for the rescue of downed airmen and wounded personnel in Southeast Asia has indicated a great need for some protection of the rescuee during the critical pick-up and retrieval operation, where vulnerability to enemy ground fire is particularly emphasized. In addition, some protection is indicated for both the paramedics and/or rescuees from tree limbs and branches during both the lowering and retrieval of personnel in heavy forested or jungle canopy areas. The need for such protection is particularly emphasized when the rescue system in current use by the Air Force in Southeast Asia is considered. This system, which is described and claimed in U.S. Pat. No. 3,444,569, issued on May 20, 1969 to A. Greenberg et al., involves a rescue device having three seats pivotally mounted to a shank portion and an eye at its upper end for receiving the hook of the hoist cable. Basically, no protection means are afforded to the rescuee, for example, other than a safety strap. A later development, described and claimed in U.S. Pat. No. 3,476,339, issued on Nov. 4, 1969 to B. G. Pugh, incorporates an overhead canopy which would, of course, offer some protection to the rescuee against trees and limbs, for example. However, with use of the latter arrangement, it is apparent that the rescue helicopter must remain in its hovering position for a longer period than that of the system of the present invention, to be described hereinafter, since the unstreamlined Pugh device would tend to spin once the helicopter assumed horizontal flight. Moreover, a rescuee in the Pugh device would be principally protected only from trees or limbs directly overhead during the ascent or retrieval phase of rescue operation. The bulk of his body remains unprotected particularly should his ascent, for example, be oriented out of the vertical configuration. Finally, the rescuer is completely unprotected during the lowering operation where severely wounded personnel may be involved. On the other hand, the unique and yet simplified protection capsule of the present invention, to be described hereinafter in the following summary and detailed description thereof, was developed for the express purpose of providing the aforementioned protection of personnel.

SUMMARY OF THE INVENTION

The present inventon consists briefly in a rescue capsule incorporating a cylindrical-shaped body portion which is stream-lined by having cone-like portions on the ends thereof to provide for relatively easy penetration of heavy forests and jungles. A fixture or eye-like element is provided on one of the cone-like portions for releasable engagement with the hook-element of the hoist mechanism of a rescue helicopter.

Certain objects and advantages of this invention will become readily apparent in the disclosure thereof, taken in connection with the accompanying drawings, in which:

BRIEF DESCRIPTION OF THE DRAWINGS

FIG. 2 is a second somewhat schematic and partially broken-away view, showing the rescue capsule of FIG. 1 suspended from the helicopter-borne hoist device.

DESCRIPTION OF THE PREFERRED EMBODIMENT

Figure 1:
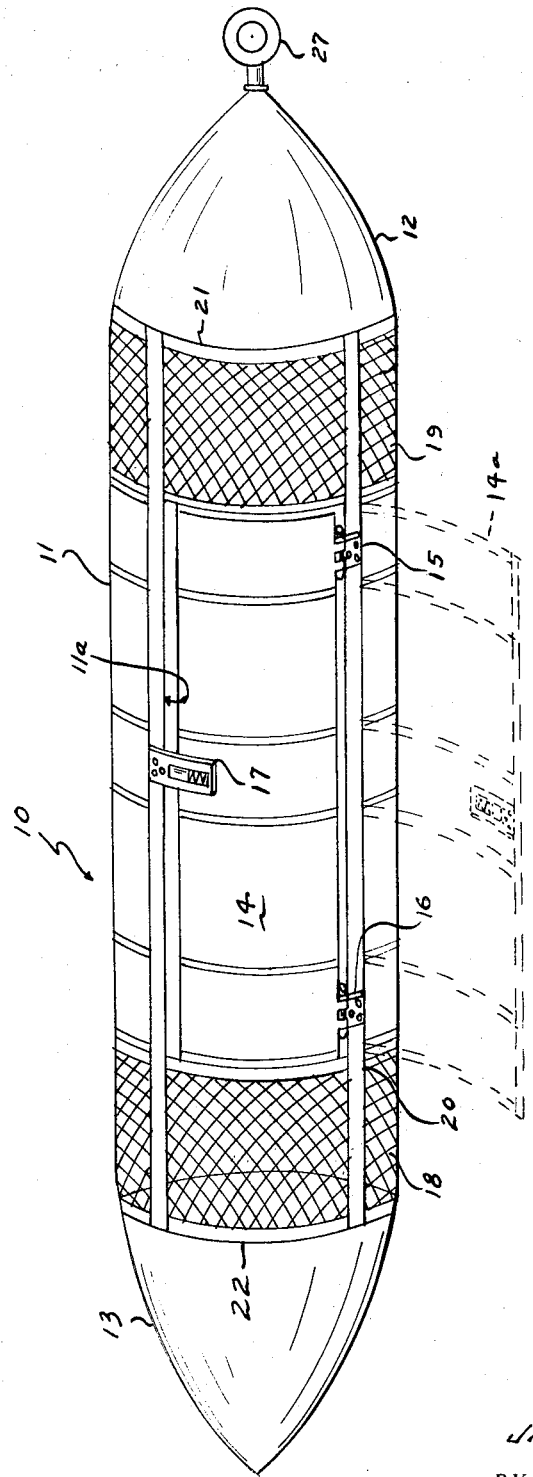
FIG. 1 is a somewhat schematic and side elevational view, illustrating details of the improved rescue capsule of the present invention.

Referring generally to the drawings and, in particular, to FIG. 1 thereof, the novel rescue capsule of the present invention is indicated generally at 10 as consisting principally of a main, caged body portion 11 that is ribbed, as shown, for the purpose of strength and further is of cylindrical configuration, an identical pair of cone-shaped elements 12 and 13 integrally formed on, or to each end of the body portion 11 to thereby create a streamlined configuration, and a ribbed door panel, indicated in closed and open positions at 14 and 14a, respectively, for permitting entry of both rescuer and rescuee into the interior of the caged body portion 11. To provide for the opening and closing action of the said door panel 14, the latter may be equipped with a suitably designed pair of standard-type hinges spaced apart along one edge thereof, as indicated schematically at 15 and 16. In addition, door panel 14 may be retained in its closed position by means of an appropriate latch mechanism, also indicated in schematic form at 17, of any well-known design, the specific nature of which forming no part of the present invention.

The foregoing capsule-body portion 11 may preferably consist of a partially enclosed body to thereby provide for an expanded entry at 11a for admitting both rescuer(s) and rescuee(s) alike into, and further provide egress from, the interior of said body portion 11. It is this entry 11a that is closed by the previously described door panel 14. The aforesaid body portion 11 is further partially enclosed because of the incorporation therein of the oppositely disposed wire mesh-body sections, indicated at 18 and 19. As clearly illustrated in the aforementioned FIG. 1, wire mesh-body sections 18, 19 are each disposed in intermediate relation between, and form an integral continuation of the main body portion 11 and the cone-like members 12 and 13. To complete the structure of the body portion 11, the latter, which may be comprised of, or fabricated from a suitable aluminum material, may be reinforced and thus supported by a longitudinally disposed and integral frame-body portion, indicated generally at the reference numeral 20. Further reinforcement to the body portion 11 may be provided by the cylindrical and disc-like members at 21 and 22, which may be integrally provided respectively at the juncture between each of the cone-shaped elements 12 and 13 and the body portion 11 to thereby actually enclose the opposite end portions of, and thus form the body-enclosed, interior space of the body portion 11. This enclosed interior space is, of course, the space into which the rescuer(s) and rescuee(s) enter and remain during the rescue and retrieval operation. The disc-like member 22 also forms the floor upon which one or two rescuers and/or rescuees stand during their stay within the inventive capsule 10.

With particular reference to the partially schematic and broken-away perspective view of FIG. 2, the unique rescue capsule 10 of the present invention is shown suspended from the hoist mechanism, indicated generally at 23, of a helicopter, a portion of which being indicated in schematic form at 24, with the open doorway thereof being indicated at 25. The hoist mechanism 23, which may be supported in overlapping relation to the top surface of the helicopter by means of suitable supporting structure, such as that indicated generally at 23a and 23b, comprises, in part, a reel at 30 that may incorporate a bungee-equipped, hoist cable, indicated generally at 28, to the lower end of which is incorporated a hook element at 26. The latter element 26, together with a standard-type snap lock (not shown), is releasably engaged with a fixture or eye-like element 27 that may be integrally formed, as shown, on the top of the cone-shaped element 12 of the rescue capsule 10. A quick-release-type stabilizer bar may be required, as schematically and generally illustrated at 29, to retain rescue capsule 10 in a firm, rigid-type position during transit operations, or, alternatively, capsule 10 may be held within the helicopter until its use is required. For wounded personnel, the body portion 11 could, of course, be easily equipped with fixture elements or attachment means along its length for allowing the horizontal pick-up or retrieval thereof, instead of the vertical pick-up shown in FIG. 2.

With the inventive escape capsule 10 being suspended from the helicopter-borne hoist mechanism 23, the aforesaid capsule 10 may be transported by the helicopter to the rescue area and then lowered to the ground level with, for example, one or two paramedics or other rescuers housed therein. During this lowering phase, the rescuers may direct small arms suppression fire to bear on selected ground targets in a much more effective way than with other rescue methods because of the relatively stable firing platform provided by the invention. Furthermore, rescued personnel, if not severely wounded, could also employ defensive fires during retrieval operations. Also, the bottom cone-shaped element at 13 facilitates the entry and penetration of the escape capsule 10 into heavy forests and jungle canopy areas during lowering operations. The streamlined shape provided by the upper cone-shaped element 12 would further facilitate the passage of the capsule 10 through dense foliage in the retrieval phase. Moreover, the capsule 10 offers the significant advantage of providing means for storing communications equipment, such as a "walkie-talkie" to thereby provide highly desirable communication between the rescuers and rescuees, and the helicopter crewmen and/or friendly ground troops during the rescue operation.

Thus, the present invention affords a unique, and relatively simplified and inexpensive means for protecting both rescued personnel and rescuers, such as paramedics, from injury during the descent and ascent phase through heavy forested and jungle canopy areas. Since the inventive rescuee capsule 10 is made of a lightweight aluminum and only partly enclosed construction, its weight is estimated as being only approximately 100 pounds and, therefore, existing rescue hoists having only a 600 pound capacity would be more than adequate therefor. However, for heavier-types of capsules, a 1,000-pound hoist capacity is presently under development.

I claim:

1. In a rescue-type of helicopter having a rescue-hoist assembly supported thereto and comprising a reel-operated hoist cable, and a hook device on the lower end of the cable; apparatus releasably interconnected with the hook device for rescuing downed and/or wounded personnel; said apparatus comprising combined personnel-supporting and protection means including a relatively stable and horizontally disposed platform means for supporting at least one rescuer and/or rescuee personnel in a relatively stable, standing position thereon; and a rigid, personnel-protecting-enclosure member incorporating said platform means at or near a bottom end thereof and further housing, surrounding and thereby simultaneously ensuring the stabilized support and substantial shielding-type of protection of the said personnel from impact injuries normally resulting from lowering and retrieval-rescue operations particularly in heavy forested, jungle canopy and/or other dense foliage areas, and additionally providing for the relatively accurate deployment of defensive fires by said rescuer and/or rescuee personnel against selected ground targets throughout the rescue operations; said enclosure member comprising a relatively enlarged, metallic body member incorporating an expanded opening; and a rotatable door member formed within said opening and adjustable relative thereto for providing both for the relatively easy and rapid admission into, and egress from the interior of said enclosure member of the rescuer and/or rescuee personnel, and for further facilitating the employment of the said defensive fires; the relatively enlarged, metallic body member further comprising a first, main and solid caged body portion incorporating said expanded opening; and a reinforcing and exteriorily-disposed, frame assembly integrally formed in longitudinal relation on the outer circumference of, and thereby providing additional strength to, and supporting said caged body portion.

2. In a rescue-type helicopter as in claim 1, wherein said caged body portion and frame assembly further comprises a streamlined-body completely enclosing the rescuer and/or rescuee personnel therewithin and having a cylindrical section; and oppositely-disposed cone-shaped elements respectively formed on the upper and lower ends of said cylindrical section for facilitating the relatively easy penetration of the rescue apparatus through the heavy forested, jungle canopy and/or other dense foliage areas, and thus providing still further protection to the said personnel.

3. In a rescue-type helicopter as in claim 2, wherein said caged body portion and frame assembly further incorporates a relatively short wire mesh-body section disposed in opposed and integral relation between each of the said cone-shaped elements and the opposite ends of said cylindrical section to thereby provide a relatively strong assembly.

* * * * *